United States Patent [19]
Nowak

[11] Patent Number: 5,218,881
[45] Date of Patent: Jun. 15, 1993

[54] REMOTE CONTROL ASSEMBLY WITH SERVICEABLE TERMINAL

[75] Inventor: Joseph M. Nowak, Berkley, Mich.

[73] Assignee: Teleflex Incorporated, Limerick, Pa.

[21] Appl. No.: 788,881

[22] Filed: Nov. 7, 1991

[51] Int. Cl.⁵ .............................................. E16C 1/10
[52] U.S. Cl. .................................. 74/502.6; 74/502.4; 74/501.5 R; 248/74.3
[58] Field of Search ..................... 74/502, 501.5, 502.2, 74/502.4, 502.6; 403/330; 248/221.4, 74.1, 74.3

[56] References Cited

U.S. PATENT DOCUMENTS

| | | | |
|---|---|---|---|
| 2,234,602 | 3/1941 | McIntosh | 417/262 |
| 3,662,617 | 5/1972 | Bennett | 74/502.4 |
| 3,710,645 | 1/1973 | Bennett | 74/502.4 |
| 4,546,666 | 10/1985 | Secord | 74/502.4 |
| 4,624,155 | 11/1986 | Wing | 74/501.5 |
| 4,798,098 | 1/1989 | Keller et al. | 403/330 |
| 4,805,479 | 2/1989 | Brightwell | 74/501.5 R |
| 4,841,805 | 6/1989 | Italiano | 74/502 |
| 4,869,123 | 9/1989 | Stocker | 74/501.5 |
| 4,884,468 | 12/1989 | Muramatsu et al. | 74/502.6 |
| 4,944,475 | 7/1990 | One et al. | 248/74.3 |

Primary Examiner—Carl D. Friedman
Assistant Examiner—Winnie Yip
Attorney, Agent, or Firm—Reising, Ethington, Barnard, Perry & Milton

[57] ABSTRACT

A motion transmitting remote control assembly of the type for transmitting motion along a curved path by a flexible core element to a control member. The assembly (10) includes a motion transmitting core element (12) having a slug (20) secured to an end (16) thereof. A terminal (22) is provided for receiving the slug (20) to connect the core element (12) to a control member (26). A slug biasing finger (62) biases against the slug (20) to retain it within the terminal (22) during normal operation and permits the slug (20) to be detached from the terminal (22) to disconnect the core element (12) therefrom thereby allowing the core element (12) and control member (26) to be serviced independently from one another.

9 Claims, 2 Drawing Sheets

REMOTE CONTROL ASSEMBLY WITH SERVICEABLE TERMINAL

BACKGROUND OF THE INVENTION

1. Technical Field

The subject invention relates to a motion transmitting remote control assembly of the type for transmitting motion along a curved path by a flexible core element movably supported within a flexible conduit. More specifically, the subject invention relates to an assembly including a terminal removably secured to a slug attached to an end of the core element.

2. Description of the Related Art

Many remote control assemblies include a terminal connected to an end of a core element for attaching the core element to a control member. Such terminals generally include retaining members for attaching the terminal to the control member. Additionally, such terminals are preferably removably connected to the core element so that the core element may be disconnected from the terminal and control member so that the core element may be independently serviced. Ideally, the core element is secured to the terminal is such a way so as to not kink or permanently deform the core element.

Although remote control assemblies as shown in U.S. Pat. Nos. 2,234,602 to McIntosh and 4,599,913 to Dawson disclose coupling assemblies which permit the core element to be separated from a coupling, neither reference discloses a terminal attachable to a control member.

U.S. Pat. No. 4,546,666 issued to Secord discloses a remote control assembly including a terminal attached near an end of a core element. The core element is slidably disposed within a slot passing through the terminal and may be separated therefrom. Unfortunately, however, the Secord '666 assembly is connected directly to the core element by biasing and deforming the core element. Thus, the core element becomes permanently deformed as a result. Additionally, the core element can not be separated from the control member due to a slug disposed at an end of the core element which is unable to pass through a retaining member. Thus, although the Secord '666 assembly does permit the core element to by detached from the terminal, the core element can not be separated from the control member.

Finally, U.S. Pat. No. 4,624,155 to Wing discloses an assembly including a terminal for receiving a slug disposed on an end of a core element. The terminal interconnects the end of the core element with a control member and additionally allows the core element to be separated from the terminal for independent servicing. The terminal includes a pocket for receiving the slug but does not provide any means for retaining the slug within the pocket. In other words, the slug is free to move out of the pocket thus becoming inadvertently disconnected therewith.

SUMMARY OF THE INVENTION AND ADVANTAGES

The subject invention is a motion transmitting remote control assembly of the type for transmitting motion along a curved path by a flexible core element to a control member. The invention comprises; a motion transmitting core element extending between a first end and a second end, a slug secured to the first end of the core element, and a terminal for receiving the slug therein to connect the first end of the core element to the control member. The invention is characterized by including slug retaining means for retaining the slug within the terminal during normal operation and for permitting release of the slug from the terminal in order to disconnect the core element from the terminal thereby allowing the core element and control member to be serviced independently from one another.

An advantage of utilizing a terminal having a slug retaining means is realized by the resulting terminal preventing inadvertent disassembly between the slug and terminal while still allowing the slug to be intentionally dissembled from the terminal.

A further advantage of utilizing a slug retaining means is appreciated by the core element remaining uncompromised as a result of being attached to the terminal.

BRIEF DESCRIPTION OF THE DRAWINGS

Other advantages of the subject invention with be readily appreciated as the same becomes better understood by reference to the following detailed description when considered in connection with the accompanying drawings wherein.

DETAILED DESCRIPTION OF THE PREFERRED EMBODIMENT

Figure 1:
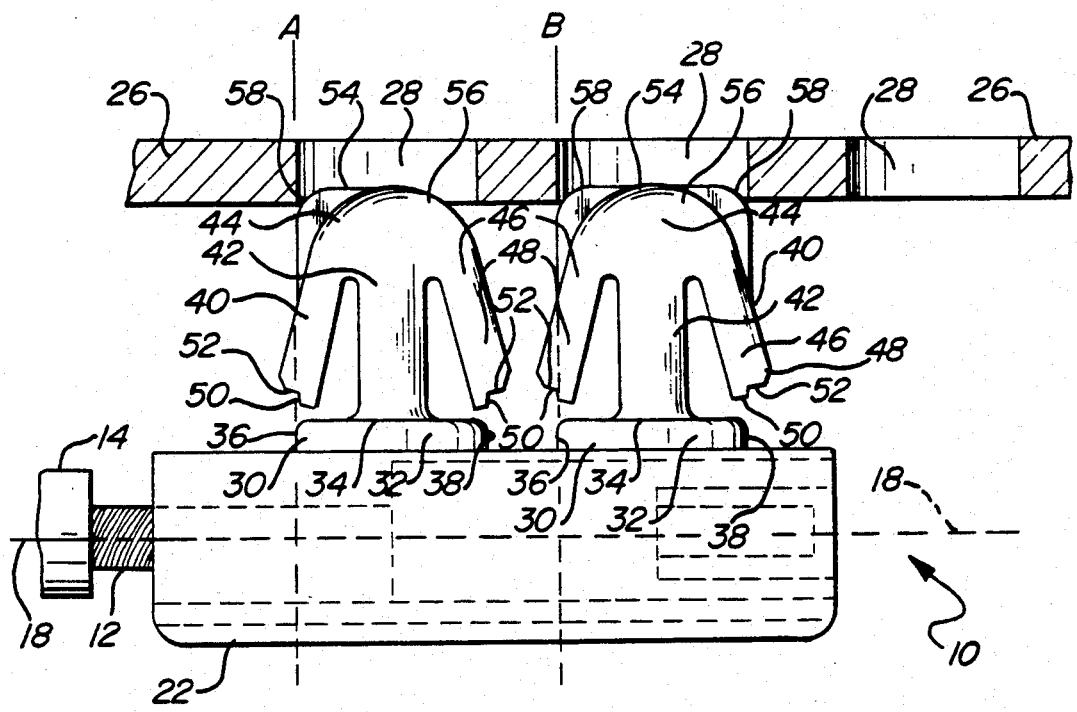
FIG. 1 is a side view partially broken away of the subject invention showing the locator means partially inserted within the attachment openings of the control member.

Referring now to the drawings wherein like numerals indicate like or corresponding parts throughout the several views, a motion transmitting remote control assembly of the type for transmitting motion along a curved path by a flexible core element to a control member is generally shown at 10 in the Figures.

Figure 2:
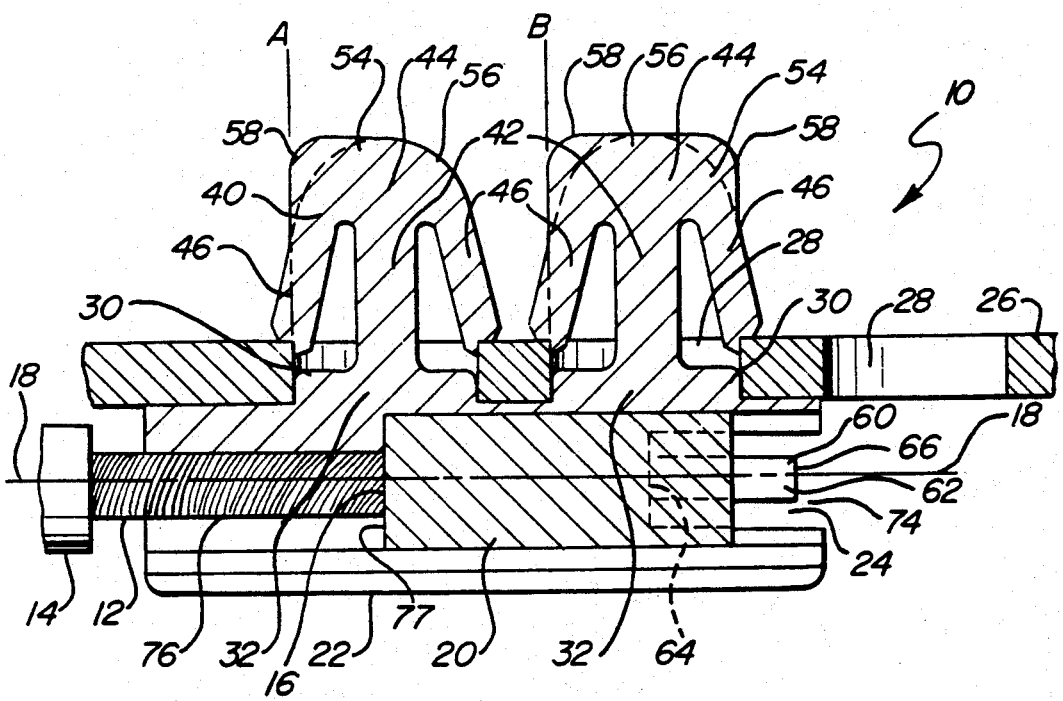
FIG. 2 is a side view in cross section of the subject invention showing the bases retained in close fit with the attachment openings of the control member.

Turning to FIGS. 1 and 2, the subject invention is shown in side view including a motion transmitting core element 12 slidably disposed within a conduit 14. The core element 12 extends between a first 16 and second end (not shown) and defines a longitudinal axis 18. A slug 20 or enlarged head is secured to either end of the core element 12 or may be secured to both ends thereof. The slug may be molded integrally about the end of the core element 12 or may be clamped, clasped, or attached by other means commonly known in the art.

A terminal 22 is provided for receiving the slug 20 to connect the first end 16 of the core element 12 to a control member. More specifically, the terminal 22 includes a chamber 24 disposed therein for receiving the slug 20. The slug 20 is positioned within the chamber 24 in order to secure the core element 12 to the terminal 22.

A control member, such as a lever arm or the like is shown at 26 and includes a number of attachment openings 28 disposed axially therealong. At least one tenon 30 but preferably two tenons 30 extend outward from the terminal 22 for closely fitting within the attachment openings 28 to attach the terminal 22 to the control member 26. Each tenon 30 comprises a base 32 having a circular outer periphery 34 with axially aligned rear 36 and front 38 extremities for closely fitting within the attachment openings 28 of the control member 26. The bases 32 are preferably integral with the terminal 22 and extend therefrom. Additionally, the bases 32 are preferably rigid, that is, the shape and dimension of the bases 32 is not deformable. Once the bases 32 are tightly fit within the attachment openings 28, the rigid nature of the bases 32 do not permit the terminal to move relative to the control member 26.

Retaining means 40 are provided for retaining each base 32 in close fit within the attachment openings 28 so that the terminal is located at a final axial position. The final axial position corresponds to the position of the terminal 22 when the bases 32 are retained in close fit with the attachment openings 28 of the control member 26. Vertical dotted lines A and B are shown in FIGS. 1 and 2 to serve as references for indicated the final axial position.

The retaining means 40 includes a stem 42 extending from at least one base 32 to a distal end 44 spaced from the terminal 22. At least one and preferably two biasing arms 46 are positioned on opposite sides of each stem 42 and extend downward from the distal end 44 to a far end 48 positioned adjacent the terminal 22 for biasing the control member 26 against the terminal 22. As best shown in FIG. 2, the far end 48 of the biasing arms 46 include a projection 50 extending therefrom for engaging the attachment opening 28 of the control member 26. The far end 48 of each biasing arm 46 additionally includes an abutment 52 positioned adjacent the projection 50 for abutting against the control member 26 to retain the terminal 22 against the control member 26.

Locator means 54 are preferably disposed at the distal end 44 of each stem 42 and include an enlarged head 56 for locating the terminal at the final axial position prior to closely fitting the bases 32 within the attachment openings 28 of the control member 26. FIG. 1 shows the terminal 22 initially located axially with respect the control member 26. That is, the locator means 54 are inserted just within the attachment openings 28 of the control member 26. In such a location, the axial position of the terminal 22 may be determined before retaining the terminal 22 in place (as shown in FIG. 2). If the terminal's initially located position needs adjustment, the terminal 22 may be moved axially until the locator means 54 correspond with the proper attachment openings 28. At such a location, the terminal may be locked into place by forcing the retainer means 40 into the attachment openings 28 until the bases 32 are in close fit therein, as shown in FIG. 2.

Each enlarged head 56 includes at least one flank 58 axially aligned with the rear 36 or front 38 extremity of the base 32 positioned therebelow. That is, the flank 58 on each enlarged head 56 is aligned with either the front 38 or rear 36 extremity of the base 3 connected hereto by the stem 42. Alternatively, the enlarged heads 56 may include flanks 58 axially aligned with both the front 38 and rear 36 extremities of their corresponding bases 32. Also, each terminal 22 may include enlarged heads 56 wherein some of the heads 56 have one axially aligned flank 58 and other heads 56 have two axially aligned flanks 58, as shown in FIGS. 1 and 2. It will be appreciated by those skilled in the art that various combinations of axially aligned flanks 58 are possible and that only one axially aligned flank 58 is required. However, addition flanks 58 may further aid in locating the terminal 22 but are not essential.

Figure 3:
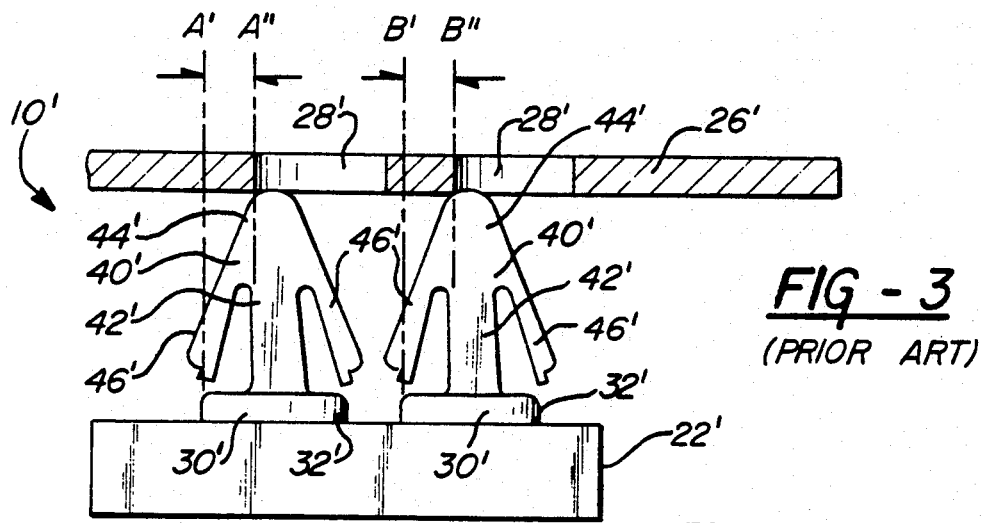
FIG. 3 is a side view partially broken away showing a prior art embodiment of the terminal.

FIG. 3 illustrates a prior art assembly 10' wherein corresponding previously described parts are denoted as primed numbers. The prior art assembly 10' does not include locator means, that is, no flanks are provided at the distal end 44' of each stem 42'. Thus, the axial position of the terminal 22', as the retaining means 40' is initially located within the attachment openings 28' (designated by reference line A" and B"), is different than the final axial position (designated by reference line A' and B') where the bases 32' are closely fit and retained within the attachment openings 28' (not shown). Unlike the prior art assembly 10', the instant invention's utilization of locator means 54 permits the terminal 22 to be maintained in the final axial position while both initially locating and finally retaining the terminal 22 in engagement with the control member 26.

Figure 6:
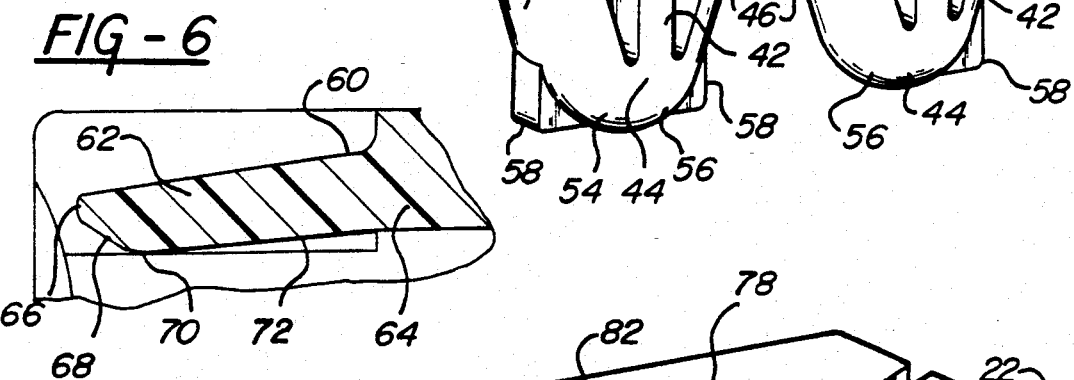
FIG. 6 is an enlarged fragmentary cross sectional view taken along line 6—6 of FIG. 5 showing the slug retaining means.

Slug retaining means 60 are provided for retaining the slug 20 within the terminal 22 during normal operation. Additionally, the slug retaining means 60 permits the slug 20 to be released from the terminal 22 in order to disconnect the core element 12 from the terminal 22 thus allowing the core element 12 and control member 26 to be serviced independently from one another. The slug retaining means 60, best shown in FIGS. 2, 4 and 6, includes at least one biasing finger 62 having a first end 64 integral with the terminal 22 and extending to a second end 66 disposed within the chamber 24. The biasing finger 62 includes a shoulder 68 extending from the second end 66 to an inner extremity 70 for engaging the slug 20 to resist movement of the slug 20 into the chamber 24. The biasing finger 62 additionally includes a ramp surface 72 extending from the first end 64 to the shoulder 68 for engaging the slug 20 once inside the chamber 24, to resist movement of the slug 20 out of the chamber 24. Thus, although movement of the slug 20 into and out of the chamber 24 is resisted, the slug 20 may be moved relative to the chamber 24. Accordingly, the slug retaining means 60 prevents inadvertent disassembly between the slug 20 and terminal 22 while still allowing the slug 20 to be intentionally disassembled form the terminal 22.

Figure 4:
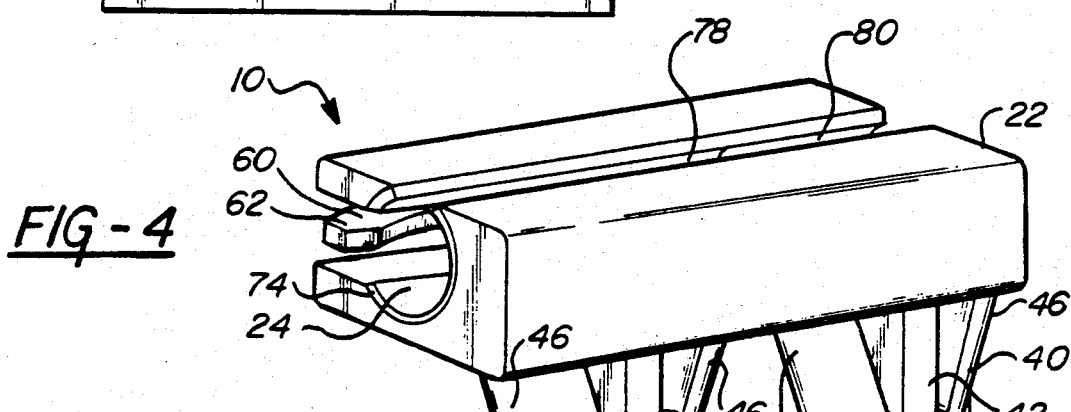
FIG. 4 is a perspective view of the preferred embodiment of subject invention showing the slot axially extending along the terminal.
Figure 5:
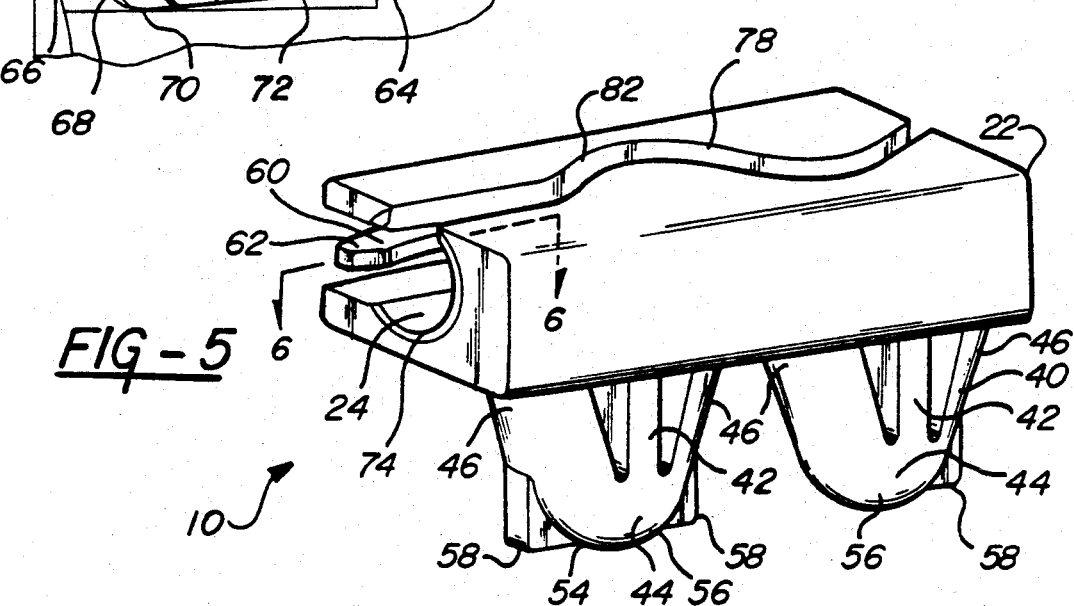
FIG. 5 is a perspective view of an alternative embodiment of the subject invention showing the slot extending through a serpentine path along the terminal.

Turning to FIGS. 4 and 5, an access 74 opening is shown in the terminal 22, positioned adjacent the chamber 24, for permitting the slug 20 to be slidably positioned within the chamber 24. A tunnel 76 extends along the longitudinal axis 18 (as best shown in FIGS. 1 and 2), through the terminal 22 and chamber 24, for supporting the core element 12 therein. The tunnel 76 is of larger in dimension than the diameter of the core element 12 so that the core element 12 may move therein without resistance. However, the tunnel 76 is smaller in dimension than the slug 20 (and chamber 24) thus preventing the slug 20 from moving therethrough. That is, a positive abutment 77 is located between the chamber 24 and the tunnel 76 which engages the slug 20 thus preventing movement of the slug 20 and the end 16 of the core element 12, relative to the terminal 22.

A slot 78 is disposed along the terminal 22, adjacent the chamber 24 and tunnel 76, for permitting the core element 12 to be positioned within the tunnel 76. Preferably, the slot 78 extends along a longitudinal path 80 spaced from and parallel with the longitudinal axis 18 (shown in FIG. 4). Alternatively, the slot 78 may extend along a serpentine path 82 spaced from the longitudinal axis 18 as shown in FIG. 5. The serpentine slot requires that the core element 12 to be slightly bent in order to be inserted within the tunnel 76. Once the core element 12 is positioned inside the tunnel 76, the core element 12 is retained longitudinally therein due to the serpentine shape required in order for the core element 12 to be moved out of the tunnel 76 through the serpentine slot.

The invention has been described in an illustrative manner, and it is to be understood that the terminology which has been used is intended to be in the nature of words of description rather than limitation.

Obviously, many modifications and variations of the instant invention are possible in light of the above teachings. It is therefore, to be understood that within the scope of the appended claims, the invention may be practiced otherwise than as specifically described.

What is claimed is:

1. A motion transmitting remote control assembly of the type for transmitting motion along a curved path by a flexible core element to a control member, said assembly comprising;

a conduit (18);

a motion transmitting core element (12) slidably disposed in said conduit (18) and including a first end (16);

a slug (20) secured to said first end (16) of said core element (12);

a terminal (22) for receiving said slug (20) therein to connect said first end (16) of said core element (12) to the control member (26);

said terminal (22) including slug retaining means (60) having at least one biasing finger for retaining said slug (20) within said terminal (22) during normal operation and for permitting release of said slug (20) from said terminal (22) while said terminal (22) remains secured to the control member (26);

said terminal (22) including a chamber (24) for receiving said slug (20) and a tunnel (76) through said terminal (22) and said chamber (24) for supporting said core element (12) therein; said tunnel (76) having a diameter smaller than a diameter of said chamber (24); and characterized by an abutment (77) located between said chamber (24) and said tunnel (76) for positively engaging said slug (20) to prohibit relative movement between said first end (16) of said core element (12) and said terminal (22).

2. An assembly as set forth in claim 1 further characterized by said biasing finger (62) having a first end (64) integral with said terminal (22) and a second end (66) disposed within said chamber (24).

3. An assembly as set forth in claim 2 further characterized by said biasing finger (62) including a shoulder (68) extending from said second end (66) to an inner extremity (70) for engaging said slug (20) to resist movement of said slug (20) into said chamber (24).

4. An assembly as set forth in claim 3 further characterized by said biasing finger (62) including a ramp surface (72) extending from said first end (64) of said biasing finger (62) to said shoulder (68) for engaging said slug (20) to resist movement of said slug (20) out of said chamber (24).

5. An assembly as set forth in claim 4 further characterized by including an access opening (74) disposed in said terminal (22) and adjacent said chamber (24) for permitting said slug (20) to be slidably positioned within said chamber (24).

6. An assembly as set forth in claim 1 further characterized by including a slot (78) disposed along said terminal (22) and adjacent said chamber (24) and tunnel (76) for permitting said core element (12) to be positioned within said tunnel (76).

7. An assembly as set forth in claim 6 further characterized by said slot (78) extending along a longitudinal path (80) spaced from and parallel with said longitudinal axis (18).

8. An assembly as set forth in claim 6 further characterized by said slot (78) extending along a serpentine path (82) spaced from said longitudinal axis (18).

9. An assembly as set forth in claim 1 further characterized by including retaining means (40) extending from said terminal (22) to a distal end (44) spaced from said terminal (22) for attaching said terminal (22) to the control member (26).

* * * * *